United States Patent
Zahnd et al.

(10) Patent No.: US 8,122,929 B2
(45) Date of Patent: Feb. 28, 2012

(54) MACHINE FOR THE PRODUCTION OF SHEET ELEMENTS FROM COMPOSITE MATERIAL

(75) Inventors: Juerg Zahnd, Utzenstorf (CH); Christoph Boos, Bern (CH)

(73) Assignee: 3S Swiss Solar Systems AG, Lyss (CH)

( * ) Notice: Subject to any disclaimer, the term of this patent is extended or adjusted under 35 U.S.C. 154(b) by 485 days.

(21) Appl. No.: 11/921,488

(22) PCT Filed: Jun. 1, 2006

(86) PCT No.: PCT/EP2006/005221
§ 371 (c)(1),
(2), (4) Date: Aug. 31, 2009

(87) PCT Pub. No.: WO2006/128699
PCT Pub. Date: Dec. 7, 2006

(65) Prior Publication Data
US 2011/0146916 A1    Jun. 23, 2011

(30) Foreign Application Priority Data
Jun. 3, 2005 (CH) ..................................... 0950/05

(51) Int. Cl.
*B32B 37/02* (2006.01)
(52) U.S. Cl. ...................... 156/382; 156/381; 156/583.3; 156/583.5
(58) Field of Classification Search .................. 156/381, 156/382, 580, 583.1, 583.3, 583.5
See application file for complete search history.

(56) References Cited

U.S. PATENT DOCUMENTS
6,367,530 B1    4/2002  Shimotomai

FOREIGN PATENT DOCUMENTS
DE  30 17 273    11/1981
EP  0 066 556    12/1982

OTHER PUBLICATIONS
International Search Report (ISR).
English translation of International Preliminary Report on Patentability (IPRP).

Primary Examiner — Khanh P Nguyen
Assistant Examiner — John Blades
(74) Attorney, Agent, or Firm — Collard & Roe, P.C.

(57) ABSTRACT

The machine (1) has a heated plate (5), conveyor means (6) for conveying the elements (4) along a conveyor path leading across the heated plate (5), a top part (8) which can be moved vertically with respect to the heated plate (5), a membrane (9) disposed on the top part (8) and a separating film (10) disposed between the membrane (9) and the heated plate (5) which can be moved synchronously with the conveyor means. The separating film (10) is divided into sections (11) and every section (11) is retained exclusively by a single edge oriented transversely to the conveying path by retaining means (32). The sections (11) therefore sit loosely on the elements (4) free of tension. The membrane (9) lies against a peripherally extending peripheral face (46) of the top part (8) facing the heated plate (5) and can be moved directly onto the plane of the surface of the heated plate (5) in order to form a closed chamber with it. Finally, the membrane (9) is connected to clamping means (25, 26, 27).

4 Claims, 3 Drawing Sheets

Figure 1:
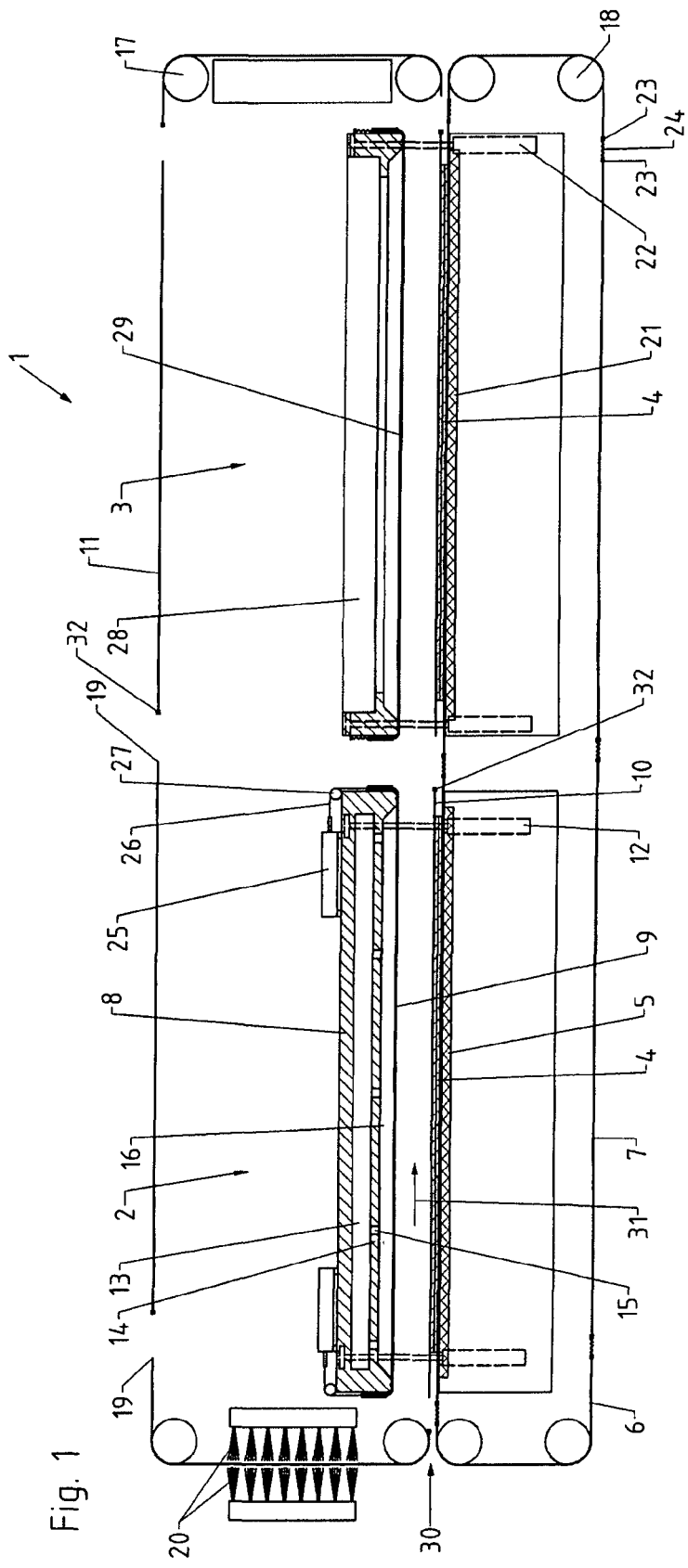

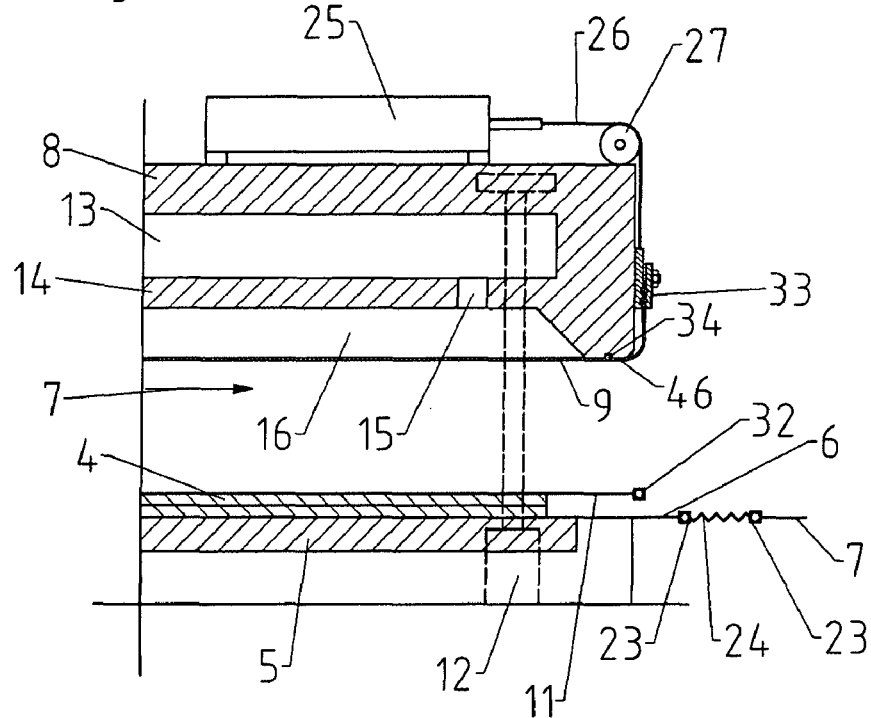
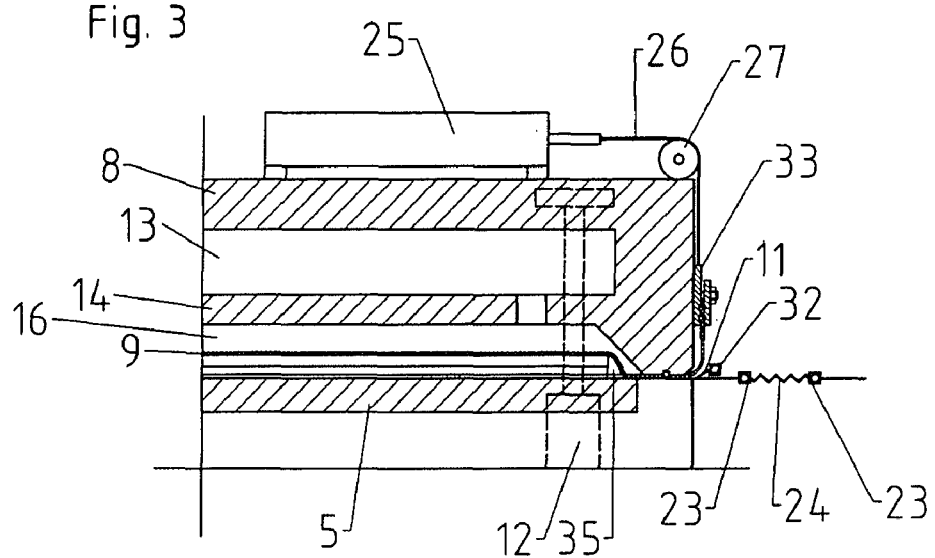

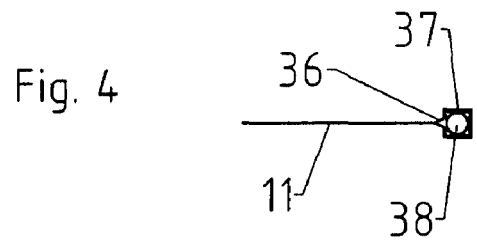
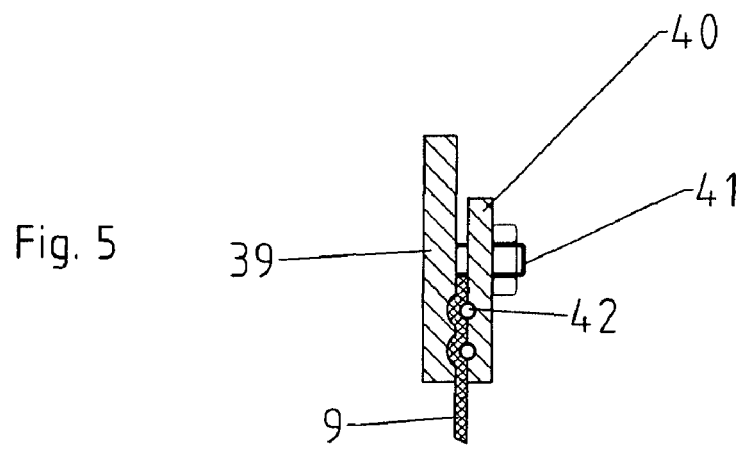
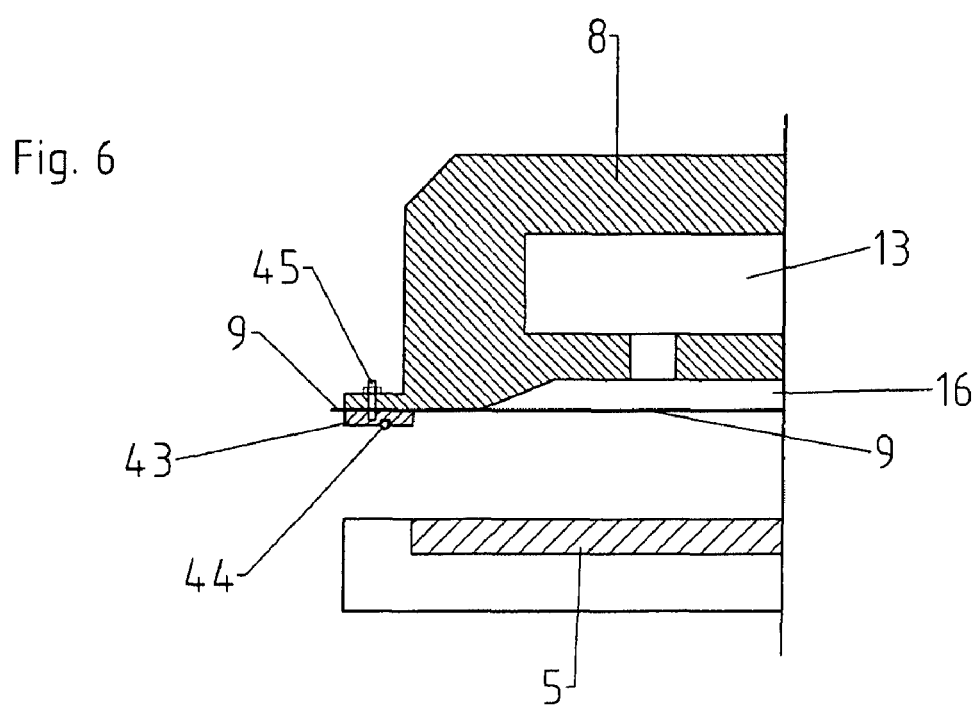

MACHINE FOR THE PRODUCTION OF SHEET ELEMENTS FROM COMPOSITE MATERIAL

CROSS REFERENCE TO RELATED APPLICATIONS

Applicants claim priority under 35 U.S.C. §119 of Swiss Application No. 0950/05 filed Jun. 3, 2005. Applicant also claims priority under 35 U.S.C. §365 of PCT/EP2006/005221 filed Jun. 1, 2006. The international application under PCT article 21(2) was not published in English.

The invention relates to a machine for producing board-shaped elements of composite material, with a heated plate, conveyor means for transporting the elements along a conveyor path running above the heated plate, a top part which can be moved vertically with respect to the heated plate, a membrane disposed on the top part and a separating film disposed between the membrane and the heated plate which can be moved synchronously with the conveyor means.

When producing board-shaped elements made from composite material, for example photovoltaic elements, several layers, including glass amongst others, are assembled under the effect of pressure and heat. The machines needed for this process generally have a heatable laminating station, a cooling station and conveying means for intermittently conveying the elements. The laminating station has a heated plate and a top part which can be lowered onto the heated plate, and a membrane is provided which forms a closed chamber in conjunction with the heated plate in the lowered state. By evacuating this chamber, gas can be removed from around the elements and the membrane is applied to the heated plate due to the pressure acting on the side of the membrane facing away from the chamber so that the elements are pressed together.

In terms of conveying means for the elements, known means comprise a conveyor belt, which simultaneously protects the heated plate against dirt, for example adhesive spilling out of the elements. In order to protect the vacuum membrane as well, a known approach is to provide a separating film for the elements, covering their top surface. Both the conveyor belt and the separating film may be used in the form of endless webs. The disadvantage of this is that control mechanisms have to be provided in order to ensure that the webs do not run sideways off the rollers conveying and turning the webs. Instead of using endless webs, a known way of avoiding this problem is to use sections which are conveyed by means of traction elements, for example chains, disposed to the side of the displacement path. This being the case, the sections are inter-connected by spring elements to form an endless loop. Due to the spring elements, the sections are subjected to tensile stress in the conveying direction, which causes the sections of separating film lying on top to lift off the elements as soon as the pressing force is removed. Any adhesive which leaks out between the separating film and the elements exerts a force directed upwards towards the elements, which is particularly problematic in the laminating station because the adhesive between the layers of elements has not yet set at this stage.

In the case of many known machines, the membrane is clamped in a frame, which is in turn sealed with respect to the heated plate and its edge by means of a peripherally extending seal when the press is closed. Apart from the extra work needed to produce the frame and the seal, the disadvantage of this approach is the fact that the membrane is subjected to high tensile forces in the region of the frame during the pressing operation. Tearing of the membrane during the pressing operation can cause damage to the elements to be laminated. During operation, the membrane is exposed to high temperature fluctuations, as a result of which it expands and contracts again with every work cycle. If the membrane is retained in the frame too loosely, there is a tendency for creases to form and it has to be tautened again. The job of subsequent tautening takes time because the frame has to be dismantled and then screwed back down again after tautening.

The underlying objective of the invention is to propose a laminating machine which does not have the disadvantages outlined above.

This objective is achieved by the invention due to the fact that the separating film is divided into sections, every section is held by retaining means exclusively at a single edge oriented transversely to the conveying path, the sections are not connected to one another and the retaining means can be moved along the conveying path by drive means.

The advantages of this solution reside in the fact that the separating film conforms efficiently to the shape of the elements to be laminated because it lies loosely on the elements and the separating film is not stretched when the press is opened, which means that no force is transmitted by the separating film to the elements. Also as a result of the invention, a saving is made on components and the work involved in inter-connecting the sections of separating film which has to be carried out in the case of known machines is dispensed with.

In one embodiment of the invention, the drive means have peripherally extending traction means, in particular chains. These traction means may be guided next to the heated plate and can be easily synchronised with the conveyor means.

In another embodiment, the sections are guided in a circle by pulley means, and in a region where the sections are guided essentially vertically in a downward direction, guides in the form of brushes are provided, with bristles oriented towards at least one of the two surfaces of the sections. Without these guides, the sections of the separating film at the rear as viewed in the conveying direction, which are effectively held by the retaining means at the front end only, drop downwards in this region and prevent the elements from getting into the machine.

In another embodiment, the retaining means have a C-shaped section, into the lengthways orifice of which a closed loop of the section extends, in which an anchoring bar is accommodated, the diameter of which is bigger than the width of the orifice. These retaining means are particularly simple and inexpensive to manufacture and also ensure that the sections of separating film are secured without creases.

By virtue of another aspect of the invention, the objective is achieved due to the fact that the membrane lies against a peripherally extending peripheral surface of the top part facing the heated plate, the membrane can be fitted on the surface of the heated place or its edge in an arrangement which provides a seal with the region of its surface lying opposite the peripheral surface to prevent excessive external pressure and the membrane is connected to clamping means disposed on the top part.

A major advantage of this solution resides in the fact that the membrane itself provides the seal on the heated plate forming a closed chamber in conjunction with it, with the separating film and optionally the conveying means inserted in between but without a frame incorporating an additional seal. During the pressing operation, therefore, few tensile forces act on the membrane because the zone in which the membrane is clamped is disposed on a level with the heated plate and not above the heated plate, as is the case with the prior art. The maximum tensile force in the membrane does not therefore occur until the press is opened, so that any tearing of the membrane which might occur does not cause damage to the laminated elements. Furthermore, a pre-defined clamping action can be obtained and maintained in the membrane by the clamping means, thereby avoiding excessive strain and creases in the membrane.

In one embodiment, the clamping means are connected to the membrane by means of clamp mechanisms. The clamp mechanisms enable the membrane to be held and clamped without having to provide holes in its edge, which can tear open in a known manner.

In another embodiment, every clamp mechanism comprises two clamping jaws which can be clamped to one another by screws and which have longitudinally disposed recesses and clamp the membrane between them, and a section deflecting the membrane is placed in at least one of the recesses. These inexpensive features enable the membrane to be secured particularly reliably without excessive strain, due to a strong pinching action.

In another embodiment, the clamping means contain a mechanism which generates at least one force. Other than a mechanism which stores a force, such as a spring, a device such as a servo-motor may be used to generate a force, which maintains a constant clamping action even in the event of big changes to the length of the membrane.

In another embodiment, the device generating the force is piston-cylinder unit. Such a unit saves on space and is particularly easy to operate.

In another embodiment, finally, the device generating the force is connected to the membrane via traction means. This feature enables the device generating the force to be positioned where space is left available on the machine.

The invention will be explained in more detail below with reference to examples of embodiments illustrated in the appended drawings.

Of these:

FIG. 1 is a schematically illustrated longitudinal section through an embodiment of the machine proposed by the invention, FIG. 2 shows a detail from FIG. 1 on a larger scale than in FIG. 1, FIG. 3 shows the same detail as FIG. 2 but in a different operating mode, FIG. 4 shows an embodiment of the retaining means for the separating film, FIG. 5 shows an embodiment of the clamping means for the membrane and FIG. 6 shows a detail from a machine of the type known from the prior art.

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc. relate to the drawing specifically being described and can be transposed in terms of meaning to a new position when another position is being described.

The embodiments illustrated as examples represent possible design variants of the machine and it should be pointed out at this stage that the invention is not specifically limited to the design variants specifically illustrated, and instead the individual design variants may be used in different combinations with one another and these possible variations lie within the reach of the person skilled in this technical field given the disclosed technical teaching. Accordingly, all conceivable design variants which can be obtained by combining individual details of the design variants described and illustrated are possible and fall within the scope of the invention.

For the sake of good order, finally, it should be pointed out that, in order to provide a clearer understanding of the structure of the machine, it and its constituent parts are illustrated to a certain extent out of scale and/or on an enlarged scale and/or on a reduced scale.

FIG. 1 is a highly simplified schematic diagram showing a view in section through the longitudinal axis of one embodiment of a machine 1 proposed by the invention. The machine is naturally mounted in a frame, although this is not illustrated in order to retain clarity. In the machine, board-shaped elements 4, such as photovoltaic elements, are conveyed by a conveyor means 6 into a laminating station 2, where the elements 4 are laminated under the effect of pressure and heat. The elements 4 are then conveyed by the conveyor means 6 in the direction of arrow 31 to a cooling station 3, where they remain under pressure for a certain period of time. The laminating station 2 essentially comprises a heated plate 5 and a top part 8 which can be moved vertically with respect to it. Reference 12 denotes lifting drives, by means of which the top part 8 can be lowered and raised relative to the heated plate 5. On its bottom face, the top part 8 bears a membrane 9, which forms a closed chamber with the heated plate 5 which can be evacuated when the top part 8 is in the lowered state. When the chamber is evacuated, the elements 4 to be laminated are pressed by the membrane 9 against the heated plate 5 and any air inclusions which might still exist between the layers of elements 4 are removed and adhesive disposed between the layers of elements 4 is activated due to the pressure and/or the heat. A chamber 16 is formed in the top part 8 between the membrane 9 and an intermediate wall 14, to which a negative pressure or a positive pressure can be applied in order either to raise the membrane 9 or push it down. A cavity 13 provided in the top part communicates with the chamber 16 via orifices 15 disposed in the intermediate wall 14.

The cooling station 3 essentially comprises a cooling plate 21 and a top part 28 which can be moved relative to it by means of lifting drives 22 and which, like the top part 8 of the laminating station 2, likewise bears a membrane 29.

The conveyor means 6 in this example are provided in the form of rectangular sections 7 of flat, flexible material, which are retained both by the front edge in the conveying direction 31 and at the rear edge in the conveying direction by retaining means 23. The retaining means 23 of two adjacent sections 7 of the conveyor means 6 are connected to one another by springs 24 so that the conveyor means 6 forms an endless loop guided around pulley blocks 18, the re-circulating strand of which is guided underneath the cooling plate 21 and the heated plate 5.

A separating film 10 is laid without any tension on every element 4 or group of elements 4 at the intake end 30 into the machine 1, on the one hand in order to protect the membrane 9 from soiling, for example due to adhesive spilling out of the elements 4, and on the other hand to prevent any force, which might occur in particular when opening the laminating station 2, from causing a relative movement between the individual layers of elements 4. Every section of the separating film 10 is retained at a leading edge in the conveying direction 31, oriented perpendicular to the conveying direction by retaining means 32, in the form of a section in the embodiment illustrated as an example here, which is moved along the conveyor path by a traction means drive, for example a chain, disposed at both ends of the conveyor path. The retaining means 32 will be described in more detail below with reference to FIG. 4. The other edges of the sections 11 of separating film 10 are free, so that every section lies loosely on the elements 4 as it is conveyed through the machine 1. This is of particular advantage on the run leading away from the laminating station 2 to the cooling station 3 because the elements 4 are still hot here and the adhesive joining the individual layers has not yet set and is therefore sticky and has a tendency to flow. If the separating film were tensioned on this run, as is the case with the machines known from the prior art mentioned above, this could lead to an undesired relative movement between the layers. The other advantage which this arrangement has over that known from the prior art is that a retaining means can be dispensed with on one side for each section of the separating film 10 and the springs connecting the sections can be dispensed with altogether. The traction means drive moving the retaining means 32 runs in a circle and the sections 11 of separating film 10 are guided by means of pulley blocks 17, as a result of which they are fed above the top parts 28 respectively 8 of the cooling station 3 and laminating station 2 back to the intake end 30 of the machine 1, on the left-hand side in FIG. 1. Guides may be provided above the machine (not illustrated), across which the free end 19 of every section of the separating film 10 is dragged. In order to prevent the sections 11 from simply falling in the region in which they are fed back in an essentially vertical direction with respect to the intake end 30, guides are provided there in the form of elongate brushes 20 oriented in the conveying direction 31. Rigid guides disposed on both faces of the separating film 10 would be inappropriate because they would then have to be separated from one another by a space to enable the retaining means 32 to pass through between them. Depending on the stiffness of the separating film 10, the latter would be able to fold backwards and forwards between the guides in this space, thereby undesirably leading to bending. By contrast, the brushes on the two sides of the separating film 10 may reach as far as its top surface, because their bristles flex, thereby enabling the retaining means 32 to pass by without any difficulty.

Although these are not illustrated, cleaning mechanisms may be provided on the run on which the conveyor means 6 and the separating film 10 are directed on leaving the cooling station 3 back to the intake end 30 of the machine 1, by means of which any soiling such as adhesive residues may be removed from the conveyor means 6 and separating film 10. As clearly illustrated in FIG. 1, the conveyor means 6 and the separating film 10 do not have to be of the same length. For example, the separating film 10 may perfectly easily have one or more sections than the conveyor means 6.

FIG. 2 is a detail from FIG. 1 on a larger scale illustrating the laminating station 2 in the opened position, in other words with the top part 8 raised. The element 4 to be laminated is positioned on the heated plate 5 with a section 7 of the conveyor means disposed in between and covered by means of a section 11 of the separating film. As may be seen from this drawing, the retaining means 32 of section 11, the retaining means 23 of section 7 and the springs 24 which interconnect the sections 23 are positioned so that they are clamped by the top part 8 as it is moved downwards. The retaining means 32 of section 11 and the retaining means 23 of section 7 are offset from one another in the conveying direction so that they do not lie on top of one another. The membrane 9 is guided around the edges 46 of the top part 8, and a seal 34 may be inserted between the membrane 9 and the top part 8. The edges of the membrane 9 are held by means of a clamp mechanism 33 which co-operates with a clamp drive 25. The clamp drive 25 is advantageously provided in the form of a hydraulically or pneumatically driven piston-cylinder unit. In order to save on space, it is of advantage if the clamp drive 25 is disposed above on the top part 8 and its force is transmitted to the clamp mechanisms 33 via traction means 26, for example Bowden cables fed by pulley blocks 27, for example. The clamp drive 25 enables a pre-defined tension to be maintained in the membrane 9. To this end, it may be connected to the control system of the machine.

FIG. 3 illustrates the laminating station closed, in other words the top part 8 has been lowered by means of the lifting drive 12 until the peripherally extending bottom edge 46 presses the seal 34, the membrane 9, the section 11 of separating film and the section 7 of the conveyor means 6 in a sealing arrangement against the heated plate 5 and its edge lying at the same level. As a result, a closed chamber 35 is formed between the heated plate 5 and the membrane 9, in which the elements 4 to be laminated are disposed. This chamber 35 is now evacuated so that gas is removed from around the elements 4 and the membrane 9 lies tightly on the elements 4 whilst section 11 of the separating film 10 lies loosely on top of them.

FIG. 4 illustrates an example of an embodiment of the retaining means 32 of section 11 of the separating film 10 on a larger scale than in the preceding drawings. Section 11 of the separating film 10 is provided with a loop 36 at a single edge, which may be formed by folding it over and welding, adhering or stitching. This loop 36 is retained in the lengthways orifice of a C-shaped section 37 by means of an anchoring bar 38, the diameter of which is bigger than the width of said orifice. The anchoring bar is advantageously of a tubular shape.

FIG. 5 illustrates the clamp mechanism for the membrane 9 on an even larger scale than illustrated in FIGS. 2 and 3 above. The membrane 9 is clamped between two clamping jaws 39 and 40, of which clamping jaw 39 is connected to the traction means 26, although this is not illustrated. In order to improve the hold of the membrane 9 in the clamp mechanism 33, the clamping jaw 40 is also provided with longitudinally extending recesses in which the fitting sections 42 fit. The clamping jaw 39 also has recesses in the region of the fitting sections, so that the membrane 9 is bent round on clamping, which significantly increases friction resistance to being torn out. Screws 41 are used to clamp the clamping jaws 39 and 40 together.

FIG. 6 is a schematic diagram showing a detail of a laminating press of the type known from the prior art. The membrane 9 is secured by means of a clamping frame 43 attached to the top part 8. The clamping frame 43 is fixedly screwed to a flange of the top part by means of screws 45 which are inserted through holes provided in the membrane 9. In order to seal the frame 43 on the heated plate 5 and its edge, it is necessary to provide a seal 44 in the clamping frame 43.

LIST OF REFERENCE NUMBERS

1 Machine
2 Laminating station
3 Cooling station
4 Board-shaped element
5 Heated plate
6 Conveyor means
7 Section of 6
8 Top part of 2
9 Membrane
10 Separating film
11 Section of 10
12 Lifting drive for 8

13 Cavity in 8
14 Intermediate wall of 8
15 Orifice in 14
16 Chamber
17 Pulley block for 10
18 Pulley block for 6
19 Free end of 10
20 Brushes
21 Cooling plate
22 Lifting drive for 28
23 Retaining means for 6
24 Spring
25 Clamp drive
26 Traction means
27 Pulley block
28 Top part of 3
29 Membrane
30 Intake end
31 Conveyor mechanism
32 Retaining means for 11
33 Clamp mechanism
34 Seal
35 Chamber
36 Loop
37 C-section
38 Bar
39 Clamping jaw
40 Clamping jaw
41 Screw
42 Fitting section
43 Clamping frame
44 Seal
45 Screw
46 Peripheral surface

The invention claimed is:

1. A machine for producing board-shaped elements of composite material comprising:
   (a) a heated plate;
   (b) a conveyor for conveying the elements along a conveyor path leading across the heated plate;
   (c) a top part vertically movable relative to the heated plate;
   (d) a membrane disposed on the top part;
   (e) a separating film disposed between the membrane and the heated plate and movable synchronously with the conveyor;
   (f) a retaining device; and
   (g) a drive for moving the retaining device along the conveyor path;
   wherein the separating film is divided into a plurality of sections unconnected to one another, each section being retained exclusively at a single edge oriented transversely to the conveying path by the retaining device.

2. The machine as claimed in claim 1, wherein the drive has a circulating traction device.

3. The machine as claimed in claim 1, wherein the sections have first and second section surfaces and said machine further comprises a pulley for guiding the sections in a circle and a plurality of guides provided in a region where the sections are fed essentially vertically downwards, said guides comprising brushes having bristles directed towards at least one of the first and second section surfaces.

4. The machine as claimed in claim 1, wherein the retaining device comprises a C-shaped section having a lengthways orifice having a width, wherein a closed loop of each section extends into the orifice, and wherein an anchoring bar having a diameter larger than the width of the orifice retains the closed loop in the orifice.

\* \* \* \* \*